(12) United States Patent
Ando et al.

(10) Patent No.: US 10,156,720 B2
(45) Date of Patent: Dec. 18, 2018

(54) INFORMATION DISPLAY APPARATUS (71) Applicant: DENSO CORPORATION, Kariya, Aichi-pref. (JP)

(72) Inventors: Hiroshi Ando, Kariya (JP); Shinji Kashiwada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 183 days.

(21) Appl. No.: 14/910,279

(22) PCT Filed: Jul. 24, 2014

(86) PCT No.: PCT/JP2014/003903
§ 371 (c)(1),
(2) Date: Feb. 5, 2016

(87) PCT Pub. No.: WO2015/019567
PCT Pub. Date: Feb. 12, 2015

(65) Prior Publication Data
US 2016/0178902 A1 Jun. 23, 2016

(30) Foreign Application Priority Data
Aug. 9, 2013 (JP) .................. 2013-166290

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *B60R 1/00* (2013.01);
(Continued)

(58) Field of Classification Search
CPC ...... G02B 2027/014; G02B 2027/0141; G02B 2027/0127; G02B 27/01; G02B 27/0101;
(Continued)

(56) References Cited

U.S. PATENT DOCUMENTS 5,502,311 A * 3/1996 Imai .................... G03F 7/70858
250/548
6,400,448 B1 * 6/2002 Sugawara ............... G01S 7/483
180/169
(Continued)

FOREIGN PATENT DOCUMENTS

JP H09086225 A 3/1997
JP H09185012 A 7/1997
(Continued)

OTHER PUBLICATIONS

International Search Report and Written Opinion (in Japanese with English Translation) for PCT/JP2014/003903, dated Sep. 16, 2014; ISA/JP.

*Primary Examiner* — Sathyanaraya V Perungavoor
*Assistant Examiner* — Philip P. Dang
(74) *Attorney, Agent, or Firm* — Harness, Dickey & Pierce, P.L.C.

(57) ABSTRACT

An information display apparatus reflects light representing information off a projection target to display the information as a virtual image, and includes a projector, at least two image forming devices and a focus adjusting device. The projector projects the light representing information. The image forming devices, to which the light from the projector is projected, are on an optical path from the projector to the projection target. At least one of the image forming devices is at a distance from the projector different from that of other image forming devices. The focus adjusting device adjusts a focal length of one optical system on an optical path from the projector to each of the image forming devices such that (Continued)

the light from the projector is in focus at each of the image forming devices. An image of information on each of the image forming devices is reflected off the projection target.

7 Claims, 9 Drawing Sheets (51) Int. Cl.
*G09F 9/00* (2006.01)
*B60R 1/00* (2006.01)
*G06K 9/00* (2006.01)
*H04N 9/31* (2006.01)

(52) U.S. Cl.
CPC ......... *G02B 27/01* (2013.01); *G06K 9/00805* (2013.01); *G09F 9/00* (2013.01); *H04N 9/3147* (2013.01); *B60R 2300/205* (2013.01); *G02B 2027/014* (2013.01); *G02B 2027/0127* (2013.01); *G02B 2027/0141* (2013.01)

(58) Field of Classification Search
CPC ...... G06K 9/00805; G09F 9/00; B60K 35/00; B60R 2300/205; B60R 1/00
See application file for complete search history.

(56) References Cited

U.S. PATENT DOCUMENTS

| | | | | |
|---|---|---|---|---|
| 6,522,311 B1* | 2/2003 | Kadowaki | ............... | B60K 35/00 345/7 |
| 6,597,477 B2* | 7/2003 | Takada | ................... | G02B 5/32 359/15 |
| 6,742,901 B2* | 6/2004 | Kimura | ................... | H04N 5/74 348/E5.137 |
| 6,885,483 B2* | 4/2005 | Takada | ................... | G02B 5/32 359/15 |
| 7,103,460 B1* | 9/2006 | Breed | ................. | B60C 23/0408 701/29.1 |
| 7,421,321 B2* | 9/2008 | Breed | ................... | B60C 11/24 340/442 |
| 8,194,106 B2* | 6/2012 | Nomura | ................... | B41J 2/45 347/130 |
| 2001/0024231 A1* | 9/2001 | Nakamura | ........ | H04N 13/0011 348/58 |
| 2006/0071877 A1 | 4/2006 | Kanamori et al. | | |
| 2009/0160736 A1 | 6/2009 | Shikita | | |
| 2010/0177403 A1* | 7/2010 | Dolgoff | ............. | G02B 27/2278 359/629 |
| 2010/0315605 A1 | 12/2010 | Arita | | |
| 2013/0021224 A1* | 1/2013 | Fujikawa | ........... | G02B 27/0101 345/7 |
| 2013/0050655 A1 | 2/2013 | Fujikawa et al. | | |
| 2013/0147711 A1* | 6/2013 | Njolstad | ............... | G06F 3/0425 345/158 |

FOREIGN PATENT DOCUMENTS

| | | |
|---|---|---|
| JP | 2004168230 A | 6/2004 |
| JP | 2006106254 A | 4/2006 |
| JP | 2009150947 A | 7/2009 |
| JP | 2009184406 A | 8/2009 |
| JP | 2009193008 A | 8/2009 |
| JP | 2010139688 A | 6/2010 |
| JP | 2013064985 A | 4/2013 |
| JP | 2013083675 A | 5/2013 |
| WO | WO-2013051376 A1 | 4/2013 |

* cited by examiner

INFORMATION DISPLAY APPARATUS

CROSS REFERENCE TO RELATED APPLICATIONS

This application is a U.S. National Phase Application under 35 U.S.C. 371 of International Application No. PCT/JP2014/003903 filed on Jul. 24, 2014 and published in Japanese as WO 2015/019567 A1 on Feb. 12, 2015. This application is based on and claims the benefit of priority from Japanese Patent Application No. 2013-166290 filed on Aug. 9, 2013. The entire disclosures of all of the above applications are incorporated herein by reference.

TECHNICAL FIELD

The present disclosure relates to an information display apparatus that displays information.

BACKGROUND ART

Information display devices known as headup displays (HUD), which project light to the front glass of an automobile and form a virtual image in the front view of the driver to display information, have hitherto been known.

In this type of information display apparatus, it is desired to form virtual images at a plurality of different distances from the driver in order to make it easier for the driver to recognize the information.

For this reason, some information display apparatus use two image projectors disposed at different positions to form an image at each of a long distance and a short distance from the driver (see Patent Literature 1).

PRIOR ART LITERATURES

Patent Literature

Patent Literature 1: JP-2009-184406-A

SUMMARY OF INVENTION

Generally, a moving body such as an automobile has a limited installation space for an information display apparatus, so that the information display apparatus is desired to be smaller.

However, with the information display apparatus described in Patent Literature 1, it is necessary to use two image projectors to form an image at each of different distances from the driver, so that there is a problem that the device configuration is increased in size.
In other words, with the conventional information display apparatus, it is difficult to form virtual images at different distances from the driver without causing an increase in size of the device configuration.

An object of the present disclosure is to enable an information display apparatus to form virtual images at different distances from a driver without causing an increase in size of the device configuration.

The present disclosure relates to an information display apparatus that reflects light representing information off a projection target, thereby displays the information as a virtual image.

The information display apparatus related to an aspect of the present disclosure includes a projector, an image forming device and a focus adjusting device.

The projector projects the light representing the information. With regard to the image forming device, at least two image forming devices, to which the light emitted from the projector is projected, that are disposed on an optical path from the projector to the projection target. In addition, at least one of the at least two image forming devices is disposed at a distance from the projector different from a distance between the projector and remaining of the at least two image forming devices.

The focus adjusting device adjusts a focal length of one optical system disposed on an optical path from the projector to each of the at least two image forming devices such that the light emitted from the projector is in focus at each of the at least two image forming devices.

Subsequently, an image of information formed on each of the at least two image forming devices is reflected off the projection target.

In such an information display apparatus, light emitted from the projection device is brought into focus in each of the image forming devices, so that an image showing information is formed on each of at least two image forming devices. Since at least one of the image forming devices is disposed at a different distance from the projection device than that of the remaining image forming devices, the optical path lengths of these image forming devices to the projection target are different.

As a result, virtual images can be formed at a plurality of different distances from the user.

Moreover, formation of virtual images at a plurality of different distances from the user can be achieved without providing a plurality of projection devices. Therefore, an increase in size of the device configuration can be prevented as much as possible.

With the information display apparatus according to this aspect, as is seen from the above, virtual images can be formed at different distances from the driver without causing an increase in size of the device configuration.

By adjusting the focal length at high speed, the user can be made to feel as if plural sets of information are displayed at the same time.

Two of the at least two image forming devices may be disposed such that information displayed as an image formed on each of the at least two image forming devices is reflected off each of at least two regions defined along an up and down direction of the projection target. In this case, two of the at least two image forming devices are disposed such that the distance from the second image forming device to the projection target is longer than the distance from the first image forming device to the projection target. The first image forming device is image forming device for projecting an image to a lower region defined on a lower side of the projection target, and the second image forming device is image forming device for projecting an image to an upper region defined on an upper side of the projection target.

In such an information display apparatus, the distance from the second image forming device to the projection target is longer than the distance from the first image forming device to the projection target.

Therefore, the position of the virtual image formed by being reflected off the upper display region of the projection target can be made farther from the user than the position of the virtual image formed by being reflected off the lower display region.

The user's line of sight is normally directed downward when the user looks at an object at a short distance, while the line of sight is directed upward when the user looks at an object at a long distance. Thus, virtual images can be formed at positions that suitably match the lines of sight of the user. As a result, an information display apparatus that is more convenient for the user can be provided.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, embodiments of the present disclosure will be described with reference to the drawings.

First Embodiment

<Information Display Apparatus>

Figure 1:
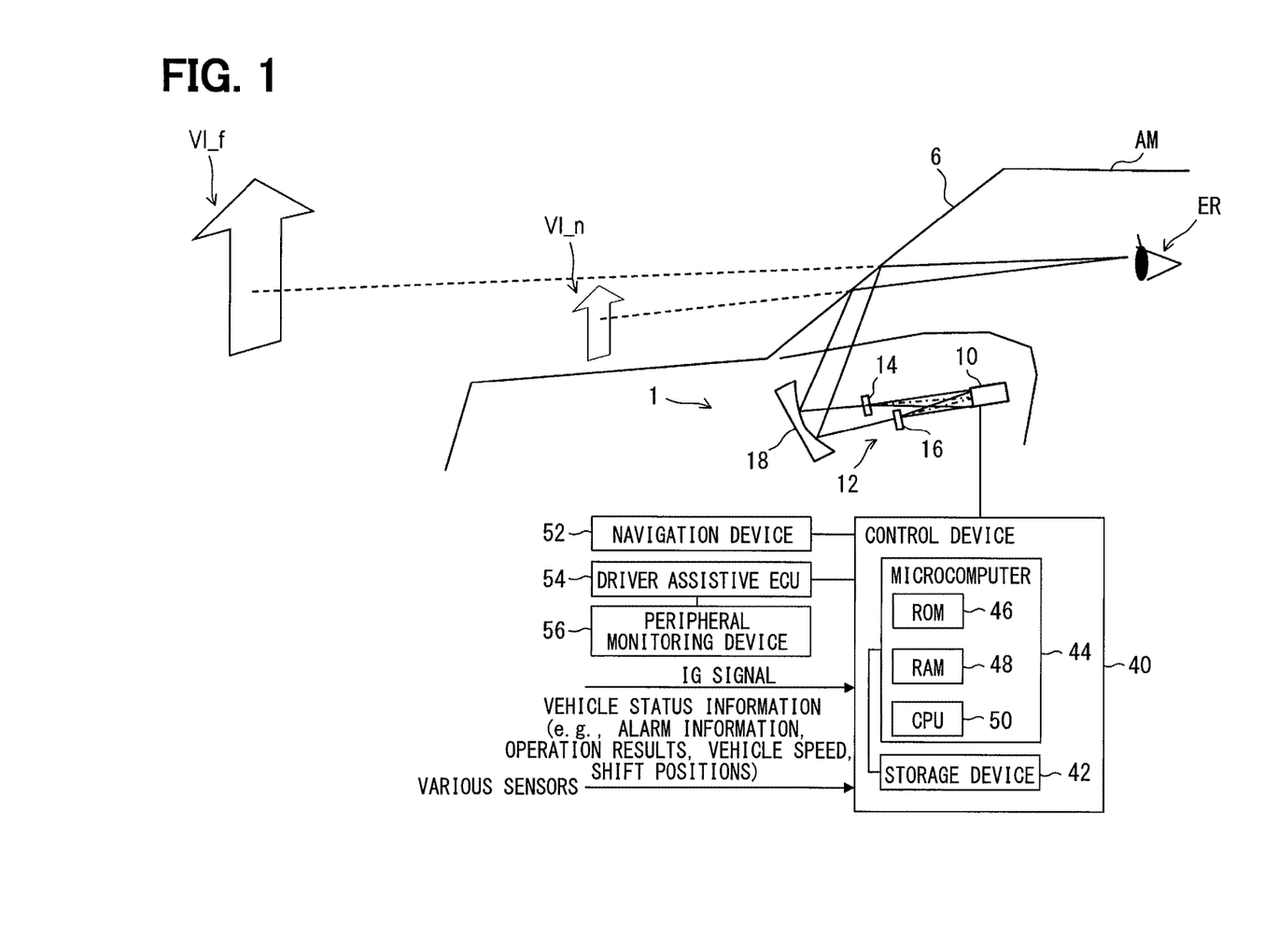
FIG. 1 is a block diagram illustrating a schematic configuration of an information display apparatus and peripheral equipment connected to the information display apparatus.

An information display apparatus 1 shown in FIG. 1 is an apparatus mounted on an automobile AM. The information display apparatus 1 is an apparatus that displays various pieces of information reflected off a projection target 6 as a virtual image VI (known as a headup display (HUD)).

The projection target 6 is a component on which information is projected. The projection target 6 is, for example, the front glass of the automobile AM. The projection target 6 is not limited to front glass but may be a known combiner.

Namely, the information display apparatus 1 of this embodiment forms a virtual image VI at each of a plurality of positions in front of a driver's car along the driver's line of sight (i.e., in the eye range ER) for the driver to view. Various pieces of information displayed as virtual images VI include vehicle information and foreground information.

The information display apparatus 1 includes an image projector 10 that projects light representing information, an image forming unit 12 that forms an image with the light from the image projector 10, an optical unit 18 that converges (or diverges) the light formed into an image of information by the image forming unit 12, and a control device 40 that controls the image projector 10.

The optical unit 18 includes an optical device that reflects light. The optical device enlarges an incident image. A concave mirror is an example of the optical unit 18.

Light reflected off the optical unit 18 is reflected off the projection target 6 and is directed toward the eye range ER.

The image forming unit 12 forms an image with the light from the image projector 10. The image forming unit 12 in this embodiment includes a first screen 14 and a second screen 16 in order to form virtual images VI at a plurality of points (two points in this embodiment) in front of the driver's car.

The first screen 14 and second screen 16 in this embodiment are known transmissive screens made of a translucent component.

The first screen 14 and the second screen 16 are disposed on the optical path from the image projector 10 to the projection target 6. Images formed on the first screen 14 and second screen 16 are reflected off and enlarged by the optical unit 18 and are projected on the projection target 6.

Of the two screens, the first screen 14 is disposed at a position for projecting an image (light) representing information in a lower display region. The "lower display region" here refers to a portion of a display region of the projection target 6 where information is reflected, that is, an area defined on a lower side in the vehicle height direction (i.e., up and down direction) of the automobile AM (an example of a lower region).

The second screen 16 is disposed at a position for projecting an image (light) of information in an upper display region. The "upper display region" here refers to a portion of the display region of the projection target 6 where an image (light) is reflected, that is, an area defined on an upper side in the vehicle height direction of the automobile AM (an example of an upper region).

More specifically, in this embodiment, the second screen 16 is disposed lower in the vehicle height direction than the first screen 14.

Moreover, in this embodiment, the second screen 16 is disposed closer to the image projector 10 than the first screen 14. Therefore, the optical path length from the second screen 16 to the projection target 6 is longer than the optical path length from the first screen 14 to the projection target 6.

An image projected on the second screen 16 is reflected off a lower part in the vehicle height direction of the optical unit 18, and is projected in the upper display region. The information projected in this upper display region is presented as a virtual image VI_f. An image projected on the first screen 14 is reflected off an upper part in the vehicle height direction of the optical unit 18, and is projected in the lower display region. The information projected in this lower display region is presented as a virtual image VI_n at a position closer to the eye range ER than the position of the virtual image VI_f thus formed.

Moreover, the first screen 14 is disposed such that the image forming plane of the first screen 14 and the virtual image VI_n that is formed by being projected via the first screen 14 and reflected off the projection target 6 have a conjugate relationship. The second screen 16 is disposed such that the image forming plane of the second screen 16 and the virtual image VI_f that is formed by being projected via the second screen 16 and reflected off the projection target 6 have a conjugate relationship.

Figure 2:
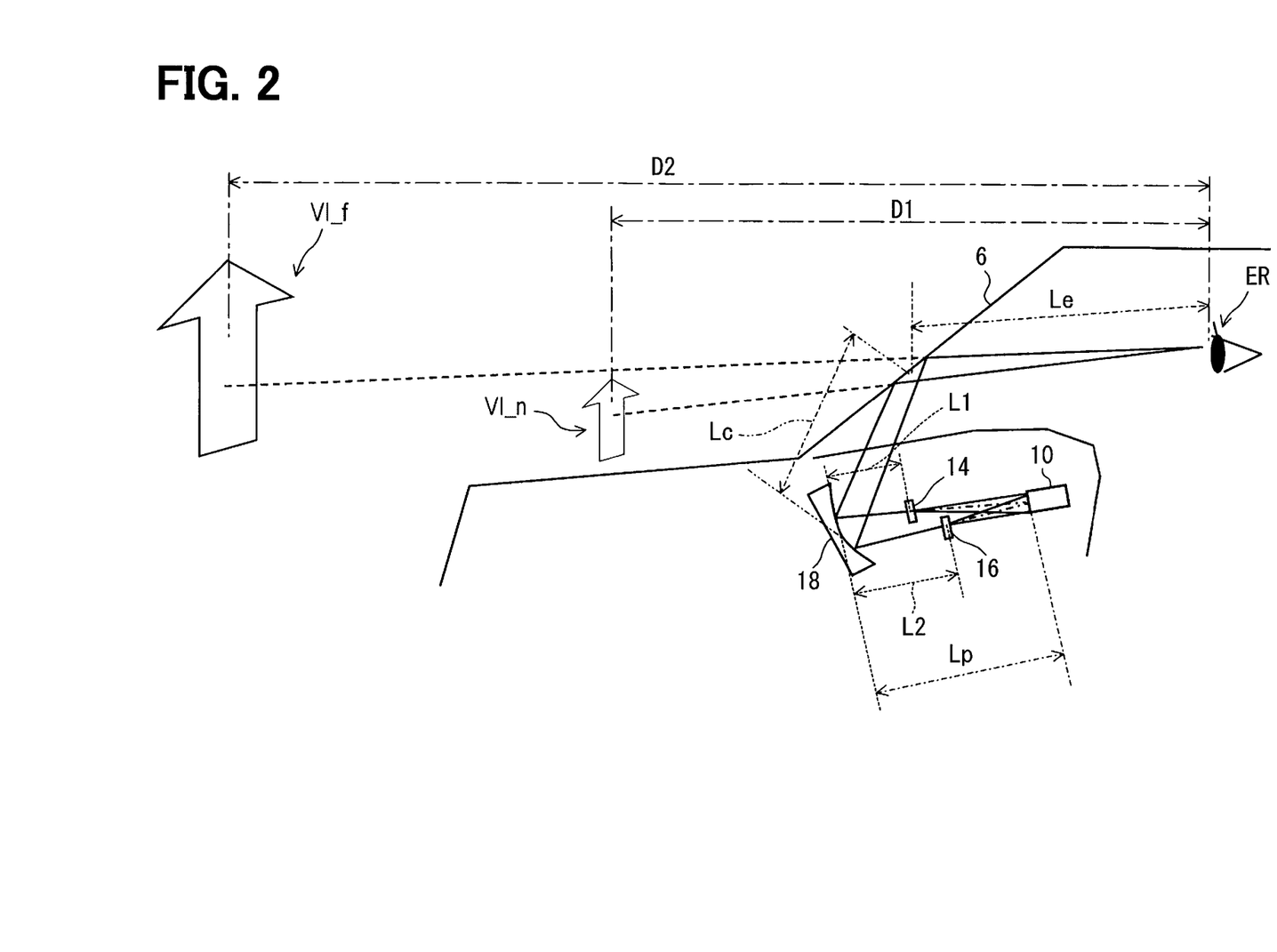
FIG. 2 is an explanatory diagram of various constituent parts of the information display apparatus.

Referring to FIG. 2, the distance from the first screen 14 to the optical unit 18 is denoted as L1, and the distance from the second screen 16 to the optical unit 18 is denoted as L2. The distance between the optical unit 18 and the projection target 6 is denoted as Lc, and the distance between the projection target 6 and the eye range ER is denoted as Le. In this case, the display distance D1 from the eye range ER to a position where the virtual image VI_n is formed and the display distance D2 from the eye range ER to a position where the virtual image VI_f is formed are expressed by Equations (1) and (2) below.

[Equation 1]

$$D1 = \frac{fw \times \left\{\frac{fc \times L1}{(fc - L1)} + Lc\right\}}{fw - \left\{\frac{fc \times L1}{(fc - L1)} + Lc\right\}} + Le \quad (1)$$

[Equation 2]

$$D2 = \frac{fw \times \left\{\frac{fc \times L2}{(fc - L2)} + Lc\right\}}{fw - \left\{\frac{fc \times L2}{(fc - L2)} + Lc\right\}} + Le \quad (2)$$

In Equations (1) and (2), fc represents the focal length of the optical unit 18, and fw represents the focal length of the projection target 6 (front glass in this embodiment).

Thus, according to Equation (1) above, the position of the first screen 14 is determined such that the image forming plane of the first screen 14 and the virtual image VI_n have a conjugate relationship with the predetermined display distance D1. According to Equation (2) above, the position of the second screen 16 is determined such that the image forming plane of the second screen 16 and the virtual image VI_f have a conjugate relationship with the predetermined display distance D2.

Figure 3:
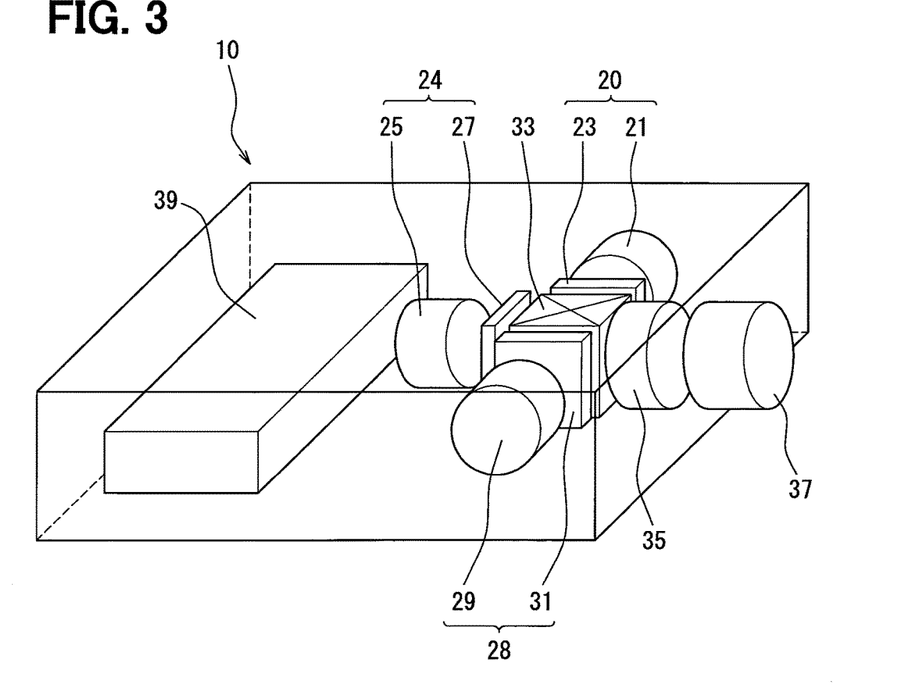
FIG. 3 is an explanatory diagram of a structure of an image projector in a first embodiment.

The image projector 10 includes a red display module 20, a green display module 24, a blue display module 28, a combining prism 33, a variable focus lens 35, a projection lens 37, and a drive circuit 39, as shown in FIG. 3.

The red display module 20 displays a red component of various pieces of information. The red display module 20 of this embodiment includes a red light source 21 that emits red light, and a liquid crystal panel (LCD) 23. The green display module 24 displays a green component of various pieces of information. The green display module 24 of this embodiment includes a green light source 25 that emits green light, and a liquid crystal panel 27. The blue display module 28 displays a blue component of various pieces of information. The blue display module 28 includes a blue light source 29 that emits blue light, and a liquid crystal panel 31.

Namely, the display modules 20, 24, and 28 may be formed by known liquid crystal displays. The red light source 21, green light source 25, and blue light source 29 may each be formed by light emitting diodes (LED).

The combining prism 33 is a known dichroic prism that combines the red light from the red display module 20, green light from the green display module 24, and blue light from the blue display module 28 such as to travel toward one direction.

The variable focus lens 35 is an optical system configured such that the focal length is variable. In this embodiment, as one example of the variable focus lens 35, a liquid lens that changes the focal length by adjusting the liquid interface of a fluid sealed in a container may be used.

The projection lens 37 is a known lens that converges (diverts) light.

The drive circuit 39 causes the display modules 20, 24, and 28 to display various pieces of information in accordance with control commands from the control device 40, and controls the variable focus lens 35.

The image projector 10 is disposed such that the exit pupil of the image projector 10 and the eye range ER have a conjugate relationship.

Namely, the position of the image projector 10 is determined such as to satisfy Equation (3) below, where Lp is the distance from the image projector 10 to the optical unit 18 (see FIG. 2).

[Equation 3]

$$D = \frac{fw \times \left\{\frac{fc \times Lp}{(fc - Lp)} + Lc\right\}}{fw - \left\{\frac{fc \times Lp}{(fc - Lp)} + Lc\right\}} + Le = 0 \quad (3)$$

That is, in the image projector 10, the red display module 20, green display module 24, and blue display module 28 output light representing the image to be projected in the display region of the projection target 6. The light beams output from each display module 20, 24, and 28 are combined by the combining prism 33 to travel toward one direction. The combined light passes through the variable focus lens 35 having a focal length adjusted so that an image is formed on the first screen 14 or the second screen 16, and is projected on the first screen 14 or the second screen 16.

The image projected on the second screen 16 is reflected off a lower part in the vehicle height direction of the optical unit 18. The light reflected off this lower part of the optical unit 18 is then reflected off the upper display region of the projection target 6 and forms the virtual image VI_f. The image projected on the first screen 14 is reflected off an upper part in the vehicle height direction of the optical unit 18. The light reflected off the upper part of the optical unit 18 is then reflected off the lower display region of the projection target 6 and forms the virtual image VI_n.

As shown in FIG. 1, the control device 40 includes a storage device 42 and a microcomputer 44. The storage device 42 is a non-volatile storage device that allows stored contents to be overwritten.

The microcomputer 44 is configured around a known computer that includes at least a ROM 46 that stores processing programs and data, which need to retain stored contents even when power is shut off, a RAM 48 that stores processing programs and data temporarily, and a CPU 50 that executes various processes in accordance with the processing programs stored in the ROM 46 or RAM 48.

The ROM 46 stores processing programs for the microcomputer 44 to execute information display processes for controlling the image projector 10 so that various pieces of information such as vehicle information and foreground information are projected on the projection target 6.

At least a navigation device 52 and a driver assistive electronic control unit (hereinafter "driver assistive ECU") 54, as the sources of the vehicle information and foreground information, are connected to the control device 40.

The navigation device 52 is a known device that shows one or more routes to a set destination in accordance with the result of a search of the current location detected by a location detector with reference to map data stored in a map data storage unit. The map data is a known set of data including node data, link data, and cost data. This map data includes various pieces of information such as speed limits and numbers of lanes of roads, and information regarding intersections.

The control device 40 acquires the speed limits or numbers of lanes of the roads corresponding to the current location where the driver's car is driving, and information such as an expected moving route of the driver's car set in the navigation device 52, as the foreground information from the navigation device 52.

The driver assistive ECU 54 is a known control device that realizes driver assistive control by controlling the drive system or brake system in accordance with obstacles detected as a result of monitoring with a peripheral monitoring device 56. The driver assistive control here refers to a known process for improving driving safety of an automobile, and includes cruise control, adaptive cruise control, pre-crash safety, lane keeping assistance, and the like.

The peripheral monitoring device 56 is a known device that monitors the situations surrounding the driver's car. Examples of the peripheral monitoring device 56 include cameras that detect an object present around the driver's car based on a taken image of the periphery of the driver's car, search devices that detect an object present around the driver's car based on a result of transmission and reception of search waves, and the like.

The control device 40 acquires distance to a car ahead or azimuth orientation of the car ahead (i.e., position where the car ahead exists), and information of positions where obstacles or signs exist, as foreground information, from this driver assistive ECU 54.

At least an ignition signal (IG) and vehicle status information are input to the control device 40.

Of these, the ignition signal is a known signal that indicates an ignition switch having been turned on.

The vehicle status information is information acquired as vehicle information. This vehicle status information includes, for example, alarm information that indicates a predefined abnormal status of a remaining amount of fuel for the internal combustion engine or water temperature of the cooling water for the internal combustion engine. An abnormal status is, for example, a condition where the amount of fuel is at or lower than a prescribed value or where the water temperature of the cooling water is at or more than a preset threshold. The vehicle status information also includes an operation result of a direction indicator, driving speed of the driver's car (i.e., vehicle speed), and shift positions of the driver's car.

<Information Display Process>

The information display process executed by the control device 40 is initiated when an ignition signal is input.

Figure 4:
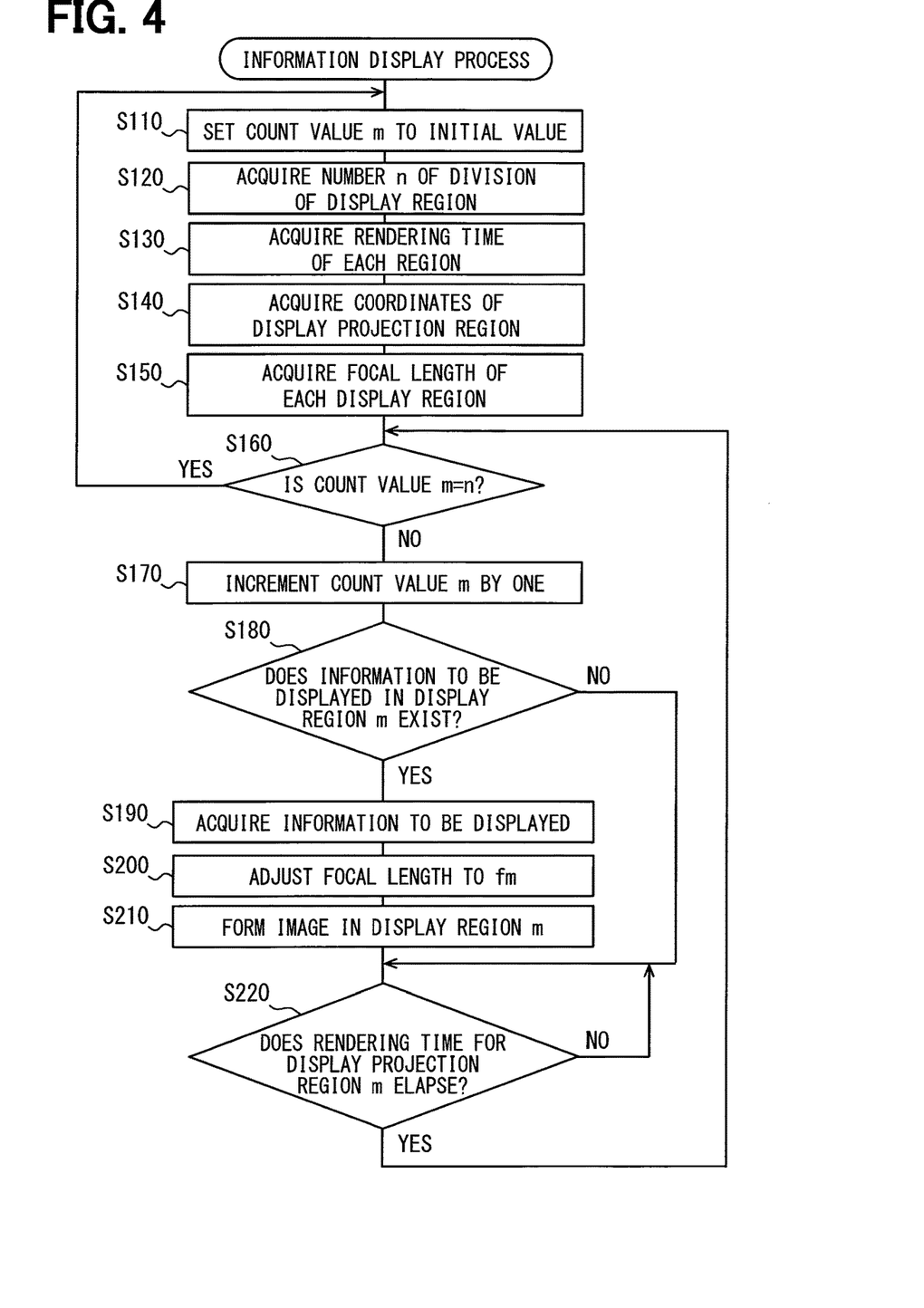
FIG. 4 is a flowchart showing a procedure of image display process steps in the first embodiment.

In the information display process, once started, as shown in FIG. 4, first, a count value indicative of a display region where the image projector 10 displays information (hereinafter, "region count value") m is set to an initial value (S110). The "initial value" here is zero.

Next, a number of regions set as the display region of the projection target 6 (i.e., number of division) n is acquired (S120). The number of division n is a predefined integer of "2" or more, and it is the number of screens provided as image forming units 12 (which is two in this embodiment). Hereinafter, the regions that are set when the display region of the projection target 6 is divided and where images will be reflected will be referred to as display projection regions. The display projection regions in this embodiment include the upper display region and the lower display region.

Next, a rendering time assigned as a time period for projecting images in each of the display projection regions of the projection target 6 is acquired (S130). Coordinates indicative of the ranges on the display modules 20, 24, and 28 of the image projector 10 corresponding to each of the display projection regions are then acquired (S140).

The rendering time in this embodiment is defined as a period not more than a value obtained by dividing 1/60 [s] by the number of division n, for example.

Successively, focal lengths f of the variable focus lens 35, which are defined for each of the first screen 14 and the second screen 16, are acquired so that images will be in focus in the screens each corresponding to the display projection regions (S150). It is then determined whether or not the region count value m matches the number of division n (S160). If the result of determination at S160 indicates that the region count value m has not reached the number of division n (S160: NO), the region count value m is incremented by one (S170).

It is then determined whether or not there exists information that is to be displayed in the display projection regions m corresponding to the region count value m (hereinafter, "information to be displayed") (S180). The information to be displayed here refers to information that has been defined preliminarily as the information that the driver needs to recognize. In this embodiment, foreground information is defined as the information to be displayed for the upper display region which is one of the display projection regions. Vehicle information is defined as the information to be displayed for the lower display region which is one of the display projection regions.

If the result of determination at S180 indicates that there is no information to be displayed (S180: NO), the process goes to S220, which will be described in detail later.

If the result of determination at S180 indicates that there is information to be displayed (S180: YES), this information to be displayed is acquired (S190). The focal length f of the variable focus lens 35 is adjusted so that images will be in focus in the screens corresponding to the display projection regions m (S200). In the image projector 10, an image that shows the information to be displayed acquired at S190 is formed in respective regions of the display modules 20, 24, and 28 corresponding to the display projection regions m (hereinafter, "corresponding regions") (S210). This image formation at S210 is realized by the display modules 20, 24, and 28 each emitting light.

In this embodiment, when foreground information is acquired as the information to be displayed, an image that shows the foreground information is formed on the second screen 16 and is reflected off the projection target 6 at S210, whereby the virtual image VI_f that shows the foreground information is formed. In this embodiment, when vehicle information is acquired as the information to be displayed, an image that shows the vehicle information is formed on the first screen 14 and is reflected off the projection target 6 at S210, whereby the virtual image VI_n that shows the vehicle information is formed.

At S210, no images are formed in regions of the display modules 20, 24, and 28 corresponding to display projection regions other than the display projection regions m (i.e., regions other than the corresponding regions). Therefore, images are displayed only in the corresponding regions.

In the information display process, successively, it is determined whether or not the rendering time assigned to the display region m corresponding to the corresponding region of the display modules 20, 24, and 28 has elapsed since an image has been formed in the corresponding region at S210 (S220). If S220 has been reached because it is determined in the process step S180 that there is no information to display (S180: NO), then it is determined at S220 whether or not the rendering time has elapsed since S220 has reached.

If the result of determination at S220 indicates that the rendering time has not elapsed yet (S220: NO), it is waited until the rendering time elapses, and when the rendering time has elapsed (S220: YES), the process goes back to S160.

Namely, in the information display process of this embodiment, projection of information to both the display projection regions, i.e., the upper display region and the lower display region, is repeated every 1/60 [s] or less.

At S160, if the region count value m has not reached the number of division n (S160: NO), the region count value m is incremented by one (S170), and the process steps S180 to S220 are executed. On the other hand, if the region count value m has reached the number of division n (S160), the process goes back to S110.

In the information display process, the process steps S110 to S220 are repeatedly executed until the ignition switch is turned off. In the information display process of this embodiment, the series of process steps S110 to S220 is carried out in 1/60 [s] or less.

Namely, in the information display process of this embodiment, light representing information to be displayed is emitted one after another from the display modules 20, 24, and 28. In the information display process, the focal length of the variable focus lens 35 is adjusted successively so that an image will be formed in focus with the emitted light on the first screen 14 or the second screen 16. The light that has passed through the variable focus lens 35 having the focal length adjusted forms an image either on the first screen 14 or the second screen 16, and is projected on the projection target 6.

Advantageous Effects of First Embodiment

As described above, in the information display apparatus 1, the first screen 14 and the second screen 16 are disposed at positions different from each other. Therefore, the optical path length from the first screen 14 to the projection target 6 and the optical path length from the second screen 16 to the projection target 6 are different.

As a result, with the information display apparatus 1, virtual images can be formed at a plurality of different distances from the eye range ER (i.e., user).

Moreover, the information display apparatus 1 achieves formation of virtual images at a plurality of different distances from the user with two screens, i.e., the first screen 14 and the second screen 16, and one image projector 10. Therefore, with the information display apparatus 1, there is no need to provide a plurality of image projectors 10 in order to form virtual images at a plurality of positions, and an increase in size of the device configuration can be prevented as much as possible.

According to the information display apparatus 1, as is seen from the above, virtual images can be formed at different distances from the driver without causing an increase in size of the device configuration.

Moreover, information is displayed by the information display apparatus 1 as images projected on the first screen 14 and second screen 16, respectively. In the information display apparatus 1, the focal length of the variable focus lens 35 is adjusted so that images formed on both screens 14 and 16 are in focus.

Moreover, in the information display apparatus 1, the first screen 14 and second screen 16 are disposed such that the image forming plane of the first screen 14 and the virtual image VI_n have a conjugate relationship while the image forming plane of the second screen 16 and the virtual image VI_f have a conjugate relationship.

According to the information display apparatus 1, because of these features, the virtual images VI_n and VI_f that are formed by being reflected off the projection target 6 can be made more readily visible for the user.

Moreover, in the information display apparatus 1, the image projector 10 is disposed such that the exit pupil of the image projector 10 and the eye range ER have a conjugate relationship. Therefore, the virtual images VI formed by the information display apparatus 1 can have a higher brightness so that the information displayed as virtual images are more readily visible for the user.

Furthermore, in the information display process of this embodiment, projection of information to the upper display region and projection of information to the lower display region are switched to one another every time the rendering time passes. By switching the projection of information at high speed, the information display apparatus 1 can cause the user to feel as if the information is displayed in both the upper display region and the lower display region at the same time.

If the focal length is adjusted at high speed, both virtual images can be prevented from being out of focus as much as possible, so that the information display apparatus 1 can form images readily recognizable for the user.

In the information display apparatus 1, the first screen 14 and the second screen 16 are disposed such that the distance from the second screen 16 to the projection target 6 is longer than the distance from the first screen 14 to the projection target 6.

According to such an information display apparatus 1, the position of the virtual image VI_f formed by being reflected off the upper display region of the projection target 6 can be made farther from the user (eye range ER) than the position of the virtual image VI_n formed by being reflected off the lower display region.

Since the user's line of sight is normally directed downward when the user looks at an object at a short distance, while the line of sight is directed upward when the user looks at an object at a long distance, the information display apparatus 1 can thus form virtual images at positions that suitably match the lines of sight of the user.

Moreover, the information display apparatus 1 forms virtual images that display vehicle information at a short distance from the user, and forms virtual images that display foreground information at a long distance from the user. Therefore, with the information display apparatus 1, for example, a virtual image that displays vehicle information can be formed to appear as if it exists above the hood of the automobile, while a virtual image that displays foreground information can be formed to appear as if it overlaps on an object present on the road.

Thus, the information display apparatus 1 can form virtual images at positions that are consistent with the user's senses, so that the information displayed as virtual images is more readily recognizable.

Moreover, in this embodiment, the series of process steps S110 to S220 is carried out repeatedly in 1/60 [s] or less. Therefore, with the information display apparatus 1 of this embodiment, image flicker can be reduced owing to the after-image effect, so that the image can be made more readily visible.

Second Embodiment

The information display device of a second embodiment is different from the information display apparatus 1 of the first embodiment mainly in the configuration of the image projector 10 and in the content of the information display process executed by the control device 40. Therefore, the configurations and processes of this embodiment that are similar to those of the first embodiment are given the same reference numerals and will not be described, and the configuration of the image projector and the information display process that are different from those of the first embodiment will be described mainly.

<Image Projector>

Figure 5:
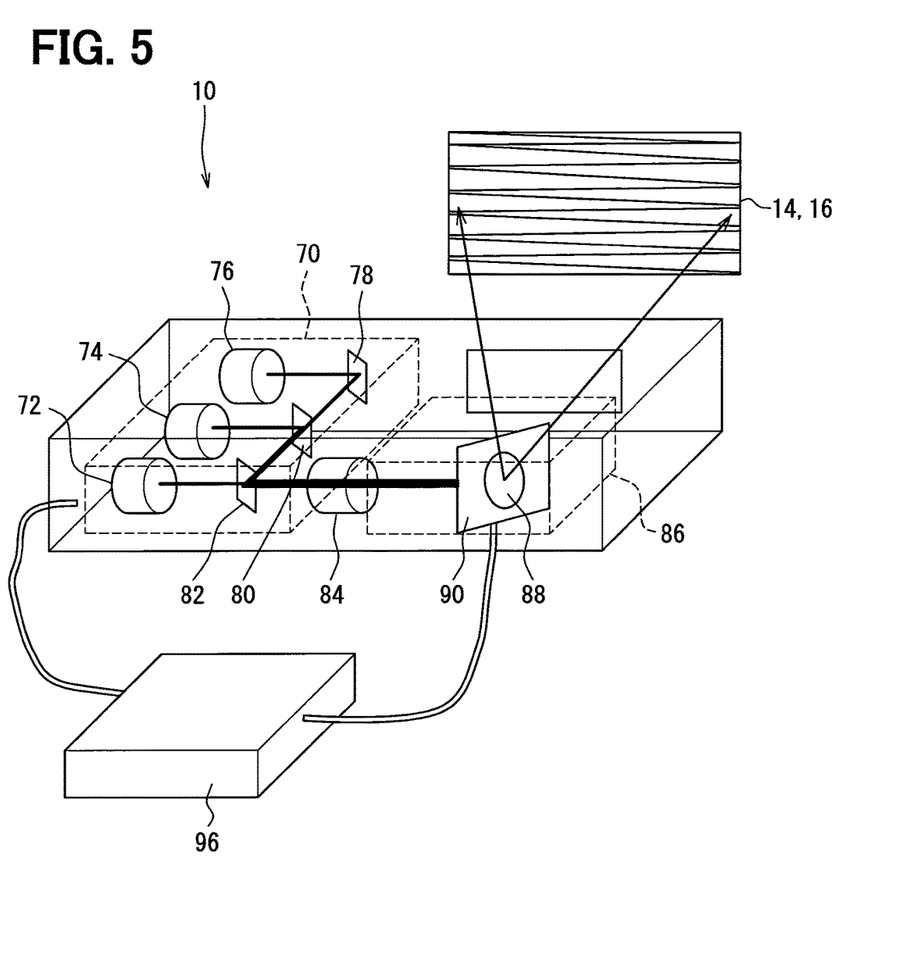
FIG. 5 is a diagram illustrating a structure of an image projector in a second embodiment.

As shown in FIG. 5, the image projector 10 in this embodiment includes a light source unit 70, a collimated light beam generator 84, a focus change unit 86, and a drive unit 96.

The light source unit 70 includes a red light source 72 that emits light of a red component of various pieces of information, a green light source 74 that emits light of a green component of various pieces of information, and a blue light source 76 that emits light of a blue component of various pieces of information. The red light source 72, the green light source 74, and the blue light source 76 may be a red laser diode (LD), a green LD, and a blue LD, respectively.

The light source unit 70 further includes dichroic filters 78, 82, and 80 that combine the red light from the red light source 72, the green light from the green light source 74, and the blue light from the blue light source such as to travel toward one direction.

The collimated light beam generator 84 converges (or diverges) the light beams combined by the dichroic filters 78, 82, and 80 to produce a collimated light beam. The collimated light beam generator 84 in this embodiment is a known collimator lens, for example.

The focus change unit 86 is an optical mechanism configured such as to be capable of changing the focal length and directs the collimated light beam from the collimated light beam generator 84 toward the first screen 14 or the second screen 16.

The focus change unit 86 includes a concave mirror 88 configured such as to be capable of changing the radius of curvature, and a scanning unit 90 that drives the concave mirror 88.

The scanning unit 90 is a component that changes its shape and position in accordance with a signal from the drive unit 96, and changes the radius of curvature of the concave mirror 88 as well as rotates the concave mirror 88 within a predefined angle range.

Namely, the focus change unit 86 is configured by a known MEMS mirror.

The drive unit 96 controls light emission from each of the light sources 72, 74, and 76, and controls the scanning unit 90 in accordance with a signal from the control device 40.

Namely, the image projector 10 of this embodiment is a type known as a scanning image projector.

The information display device of this embodiment achieves output of light that represents an image to be projected in a display region of the projection target 6 by emitting light from the light source unit 70. The focus change unit 86, to which light from the light source unit 70 is input, changes the focal length of the concave mirror 88 by changing the radius of curvature of the concave mirror 88 in accordance with a signal from the drive unit 96. Further, the focus change unit 86 swivels the concave mirror 88 at every unit time to change the reflection direction of the light incident on the concave mirror 88. Thus, the focus change unit 86 forms an image with the collimated light beam from the collimated light beam generator 84 in focus on the first screen 14 or the second screen 16.

<Information Display Process>

The information display process in this embodiment is initiated when an ignition signal is input.

Figure 6:
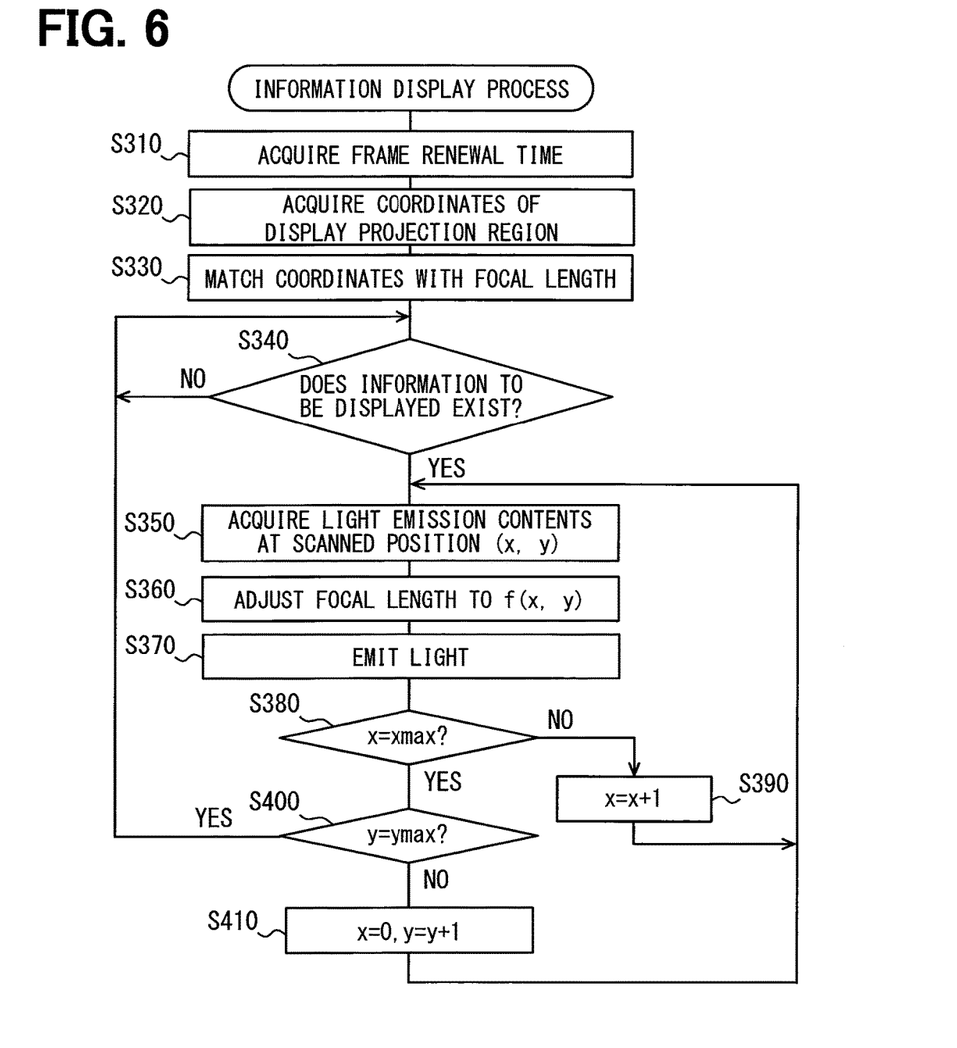
FIG. 6 is a flowchart showing a procedure of image display process steps in the second embodiment.

In the information display process, once started, as shown in FIG. 6, a frame rate (frame renewal time) is acquired first (S310), and coordinates (x, y) that indicate the range of each display projection region are acquired (S320). In this embodiment, there are two display projection regions, upper display region and lower display region, which form one continuous display region along the vehicle height direction. Coordinates (x, y) are assigned to this display region. The coordinates (x, y) assigned in this embodiment have the origin (0, 0) at the upper end in the vehicle height direction and at the left end in a vehicle width direction, and coordinates (xmax, ymax) set at the lower end in the vehicle height direction and at the right end in the vehicle width direction.

In the information display process, furthermore, each set of coordinates (x, y) is matched with the focal length f(x, y) to a screen corresponding to each set of coordinates (x, y) (S330). Namely, at S330, a focal length f to the first screen 14 is matched with coordinates (x, y) corresponding to the display region (upper display region) where an image displayed on the first screen 14 is projected. At S330, also, a focal length f to the second screen 16 is matched with coordinates (x, y) corresponding to the display region (lower display region) where an image displayed on the second screen 16 is projected.

Successively, it is determined whether or not there is information to be displayed (S340). In this embodiment, foreground information is defined as the information to be displayed for the upper display region. Vehicle information is defined as the information to be displayed for the lower display region.

If the result of determination at S340 indicates that there is no information to be displayed (S340: NO), the process waits. If the result of determination at S340 indicates that there is information to be displayed (S340: YES), the content of light emission for the information to be displayed at the coordinates (x, y) of a current time point (hereinafter, "current coordinates (x, y)") is acquired (S350).

A control signal is then output to the focus change unit 86 so as to make the focal length f of the concave mirror 88 to be the focal length for the current coordinates (x, y) (S360). Upon receiving this control signal, the focus change unit 86 drives the scanning unit 90 so that the focal length f of the concave mirror 88 will match the focal length for the current coordinates (x, y).

Further, a control signal is output to the image projector 10 so that light is emitted in accordance with the light emission content acquired at S350 (S370). When the image projector 10 receives this control signal, the light source unit 70 emits light in accordance with the light emission content acquired at S350. Light from the light source unit 70 is reflected off the concave mirror 88, after which it is formed into an image by the image forming unit 12. Namely, if foreground information has been acquired as the information to be displayed, one light point of an image that represents foreground information is displayed at one set of coordinates on the second screen 16 at S370. If vehicle information has been acquired as the information to be displayed, one light point of an image that represents vehicle information is displayed at one set of coordinates on the first screen 14 at S370.

Successively, in the information display process, it is determined whether or not the x coordinate of current coordinates (x, y) matches the maximum value xmax of x coordinates in the display region (S380). If the result of determination at S380 indicates that the x coordinate of current coordinates (x, y) does not match the maximum value xmax (S380: NO), the x coordinate of current coordinates (x, y) is incremented by one (S390). At S390, when a predefined time passes after the start of light emission at S370, a control signal is output to the focus change unit 86 for driving the scanning unit 90 so as to reflect light from the image projector 10 to the current coordinates (x, y) set at S390. Upon receiving this control signal, the focus change unit 86 rotates the concave mirror 88 along the x direction to change the orientation of the concave mirror 88, so as to reflect light from the image projector 10 to the current coordinates (x, y) set at S390.

The predefined time in this embodiment is a length of time for which light emission is continued to one set of coordinates. It is, for example, a length of time obtained by dividing the unit time of the frame rate (normally "1 second") by the frame rate itself. The frame rate in this embodiment is 60 [Hz] or more.

Thereafter, the process goes back to S350.

Meanwhile, in the information display process, if the x coordinate of current coordinates (x, y) matches the maximum value xmax (S380: YES), it is determined whether or not the y coordinate of current coordinates (x, y) matches the maximum value ymax of y coordinates in the display region (S400).

If the result of determination at S400 indicates that the y coordinate of current coordinates (x, y) does not match the maximum value ymax (S400: NO), the x coordinate of current coordinates (x, y) is changed to "0", and the y coordinate is incremented by one (S410). At S410, when a predefined time passes after the start of light emission at S370, a control signal is output to the focus change unit 86 for driving the scanning unit 90 so as to reflect light from the image projector 10 to the current coordinates (x, y) set at S410. Upon receiving this control signal, the focus change unit 86 rotates the concave mirror 88 to change the orientation of the concave mirror 88, so as to reflect light from the image projector 10 to the current coordinates (x, y) set at S410.

Thereafter, the process goes back to S350.

If the result of determination at S400 indicates that the y coordinate of the current coordinates (x, y) matches the maximum value ymax (S400: YES), the process goes back to S340 after a predefined time has passed after the start of light emission at S370. When returning to S340, a control signal is output to the focus change unit 86 for driving the scanning unit 90 so that light from the image projector 10 is reflected to the origin (0, 0). Upon receiving this control signal, the focus change unit 86 rotates the concave mirror 88 to change the orientation of the concave mirror 88, so that light from the image projector 10 is reflected to the origin (0, 0).

Thereafter, the process steps S340 to S410 are repeated.

Namely, in the information display process of this embodiment, projection of information to both display projection regions, i.e., an upper display region and a lower display region, is repeated every 1/60 [s] or less.

In the information display process of this embodiment, light is emitted toward one set of coordinates in the display region. The content of light emission is changed in accordance with the content of the information to be displayed, and the coordinates to which the emitted light is projected are changed successively. Also, in this information display process, when light is projected, the focus change unit 86 is adjusted so that the light will be in focus on the screen to which it is projected.

Advantageous Effects of Second Embodiment

According to the information display device of this embodiment, same advantageous effects as those of the information display device of the first embodiment can be achieved.

Moreover, the information display device of this embodiment employs a scanning image projector that uses an MEMS mirror as the source of image projection onto the projection target 6.

Therefore, with the information display device of this embodiment, switching of coordinates to which light is projected can be made in an extremely short period of time, so that a virtual perception as if a plurality of sets of information are displayed at the same time can be given to the user even more reliably.

In this embodiment, since the frame rate is set to 60 [Hz] or more, the series of process steps S340 to S410 is carried out repeatedly in 1/60 [s] or less. Therefore, with the information display apparatus 1 of this embodiment, image flicker can be reduced owing to the after-image effect, so that the image can be made more readily visible.

Third Embodiment

The information display device of a third embodiment is different from the information display apparatus 1 of the first embodiment or second embodiment mainly in the configuration of the image forming unit. Therefore, the configurations and processes of this embodiment that are similar to those of the first embodiment or second embodiment are given the same reference numerals and will not be described, and the configuration of the image forming unit that is different from those of the first embodiment and second embodiment will be described mainly.

<Information Display Apparatus>

Figure 7:
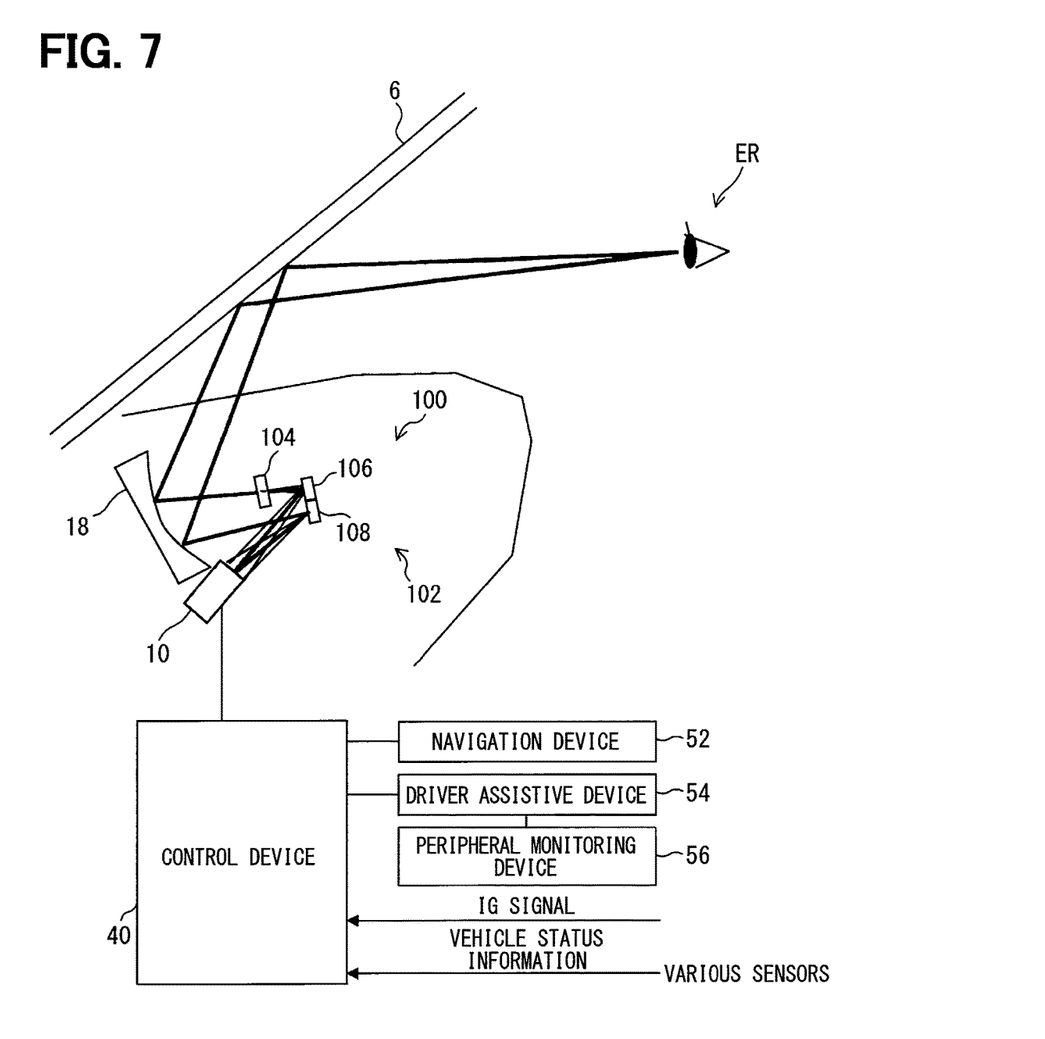
FIG. 7 is an explanatory diagram of a structure of an information display apparatus in a third embodiment.

As shown in FIG. 7, the information display apparatus 100 of this embodiment includes an image projector 10, an image forming unit 102, an optical unit 18, and a control device 40.

The image projector 10 in this embodiment is disposed such as to output light in a direction toward vehicle interior. The optical unit 18 is disposed on an upper side relative to the image projector 10 in the vehicle height direction.

The image forming unit 102 forms an image with the light from the image projector 10 and is disposed at a position opposite to the image projector 10 and the optical unit 18.

The image forming unit 102 in this embodiment includes a first screen 104, a reflection mirror 106, and a second screen 108 in order to form virtual images VI at a plurality of points in front of the driver's car.

The second screen 108 is a known reflective screen that forms an image by reflecting light. This second screen 108 is disposed such as to reflect the light from the image projector 10 toward a direction where the optical unit 18 is disposed.

The reflection mirror 106 is a known mirror that reflects light. This reflection mirror 106 is disposed such as to reflect the light from the image projector 10 toward a direction where the optical unit 18 is disposed.

The first screen 104 is a known transmissive screen made of a translucent component. This first screen 104 is disposed on the optical path from the reflection mirror 106 to the optical unit 18 and forms an image with the light from the reflection mirror 106.

The second screen 108 is disposed such as to project an image (light) that shows information in an upper display region. The first screen 104 is disposed such as to project an image (light) that shows information in a lower display region.

More specifically, the second screen 108 is disposed below the reflection mirror 106 in the vehicle height direction. Light (image) reflected off the second screen 108 is reflected off a lower part in the vehicle height direction of the optical unit 18 and projected in the upper display region of the projection target 6.

On the other hand, the first screen 104 is disposed higher in the vehicle height direction than the optical path from the second screen 108 to the optical unit 18. The image (light) formed on the first screen 104 forms the virtual image VI_n.

Moreover, in this embodiment, the second screen 108 is disposed closer to the image projector 10 than the first screen 104. Therefore, the optical path length from the second screen 108 to the projection target 6 is longer than the optical path length from the first screen 104 to the projection target 6.

The second screen 108 in this embodiment is disposed such that the image forming plane of the second screen 108 and the virtual image VI_f that is formed by being projected via the second screen 108 and reflected off the projection target 6 have a conjugate relationship. The first screen 104 is disposed such that the image forming plane of the first screen 104 and the virtual image VI_n that is formed by being projected via the first screen 104 and reflected off the projection target 6 have a conjugate relationship.

Advantageous Effects of Third Embodiment

Namely, the image forming unit 102 in the information display apparatus 1 of this embodiment is configured such as to direct the light output from the image projector 10 back by way of the second screen 108 which is a reflective screen and the reflection mirror 106.

Thus, the information display apparatus 1 can project information represented by the returned light onto the projection target 6, so that the device configuration is prevented even more reliably from increasing in size.

Fourth Embodiment

The information display device of a fourth embodiment is different from the information display apparatus 100 of the third embodiment mainly in the configuration of the image forming unit. Therefore, the configurations and processes of this embodiment that are similar to those of the third embodiment are given the same reference numerals and will not be described, and the configuration of the image forming unit that is different from that of the third embodiment will be described mainly.

<Information Display Apparatus>

Figure 8:
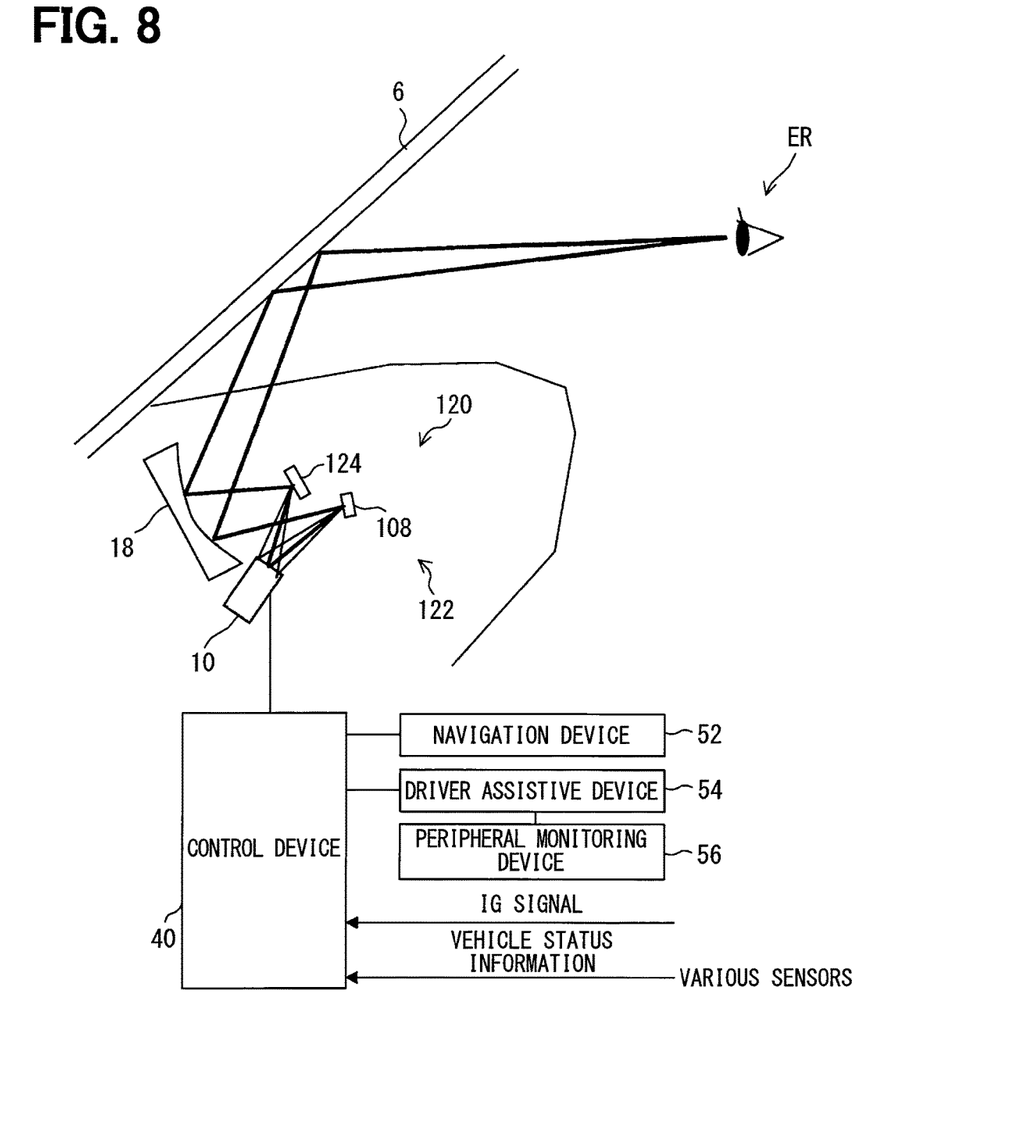
FIG. 8 is an explanatory diagram of a structure of an information display apparatus in a fourth embodiment.

As shown in FIG. 8, the information display apparatus 120 of this embodiment includes an image projector 10, an image forming unit 122, an optical unit 18, and a control device 40.

The image forming unit 122 forms an image with the light from the image projector 10 and is disposed at a position opposite to the image projector 10 and the optical unit 18.

The image forming unit 122 in this embodiment includes a first screen 124 and a second screen 108 in order to form virtual images VI at a plurality of points in front of the driver's car.

The first screen 124 is a known reflective screen that forms an image by reflecting light. This first screen 124 reflects the light from the image projector 10 toward a direction where the optical unit 18 is disposed.

The first screen 124 is disposed such as to project an image (light) that represents information in a lower display region. More specifically, the first screen 124 is disposed above the first screen 104 in the vehicle height direction.

Moreover, the first screen 124 in this embodiment is disposed such that the optical path length from the first screen 124 to the eye range ER is shorter than the optical path length from the second screen 108 to the eye range ER.

The image (light) formed on the first screen 124 forms the virtual image VI_n.

Advantageous Effects of Fourth Embodiment

Namely, the image forming unit 122 in this embodiment is configured with two reflective screens.

Thus, the information display apparatus 120 can direct the light output from the image projector 10 back, and the virtual image VI_f and the virtual image VI_n can be formed with this returned light.

Modification Examples

While the embodiments of the present disclosure have been described above, the present disclosure is not limited to the embodiments described above, and can be carried out in various forms without departing from the subject matter of the disclosure.

For example, although the image forming unit in the information display devices of the embodiments described above has two screens, the number of screens of the image forming unit is not limited to two. Namely, the image forming unit may include "three" or more screens.

Figure 9:
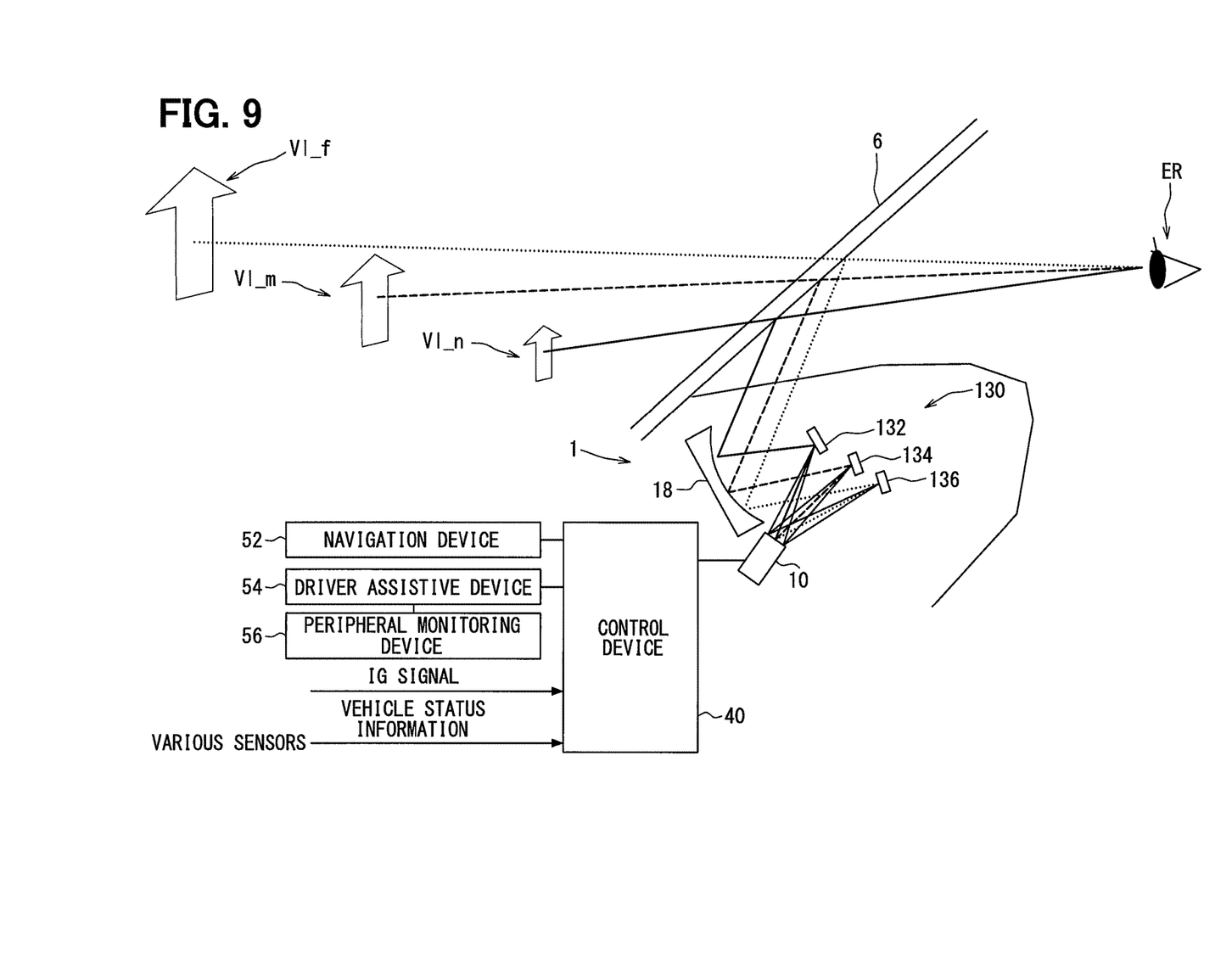
FIG. 9 is an explanatory diagram of a modification example of the structure of the information display apparatus.

In this case, as shown in FIG. 9, the image forming unit 130 preferably includes a first screen 132, a second screen 134, and a third screen 136. As shown in FIG. 9, the first screen 132, the second screen 134, and the third screen 136 are all configured by reflective screens, and are preferably disposed such that optical path lengths to the eye range ER differ from one another.

With such an image forming unit 130, virtual images VI_n, VI_m, and VI_f can be formed at positions different from one another.

The focus change unit 86 in the second embodiment described above includes the concave mirror 88 and the scanning unit 90, but the configuration of the focus change unit 86 is not limited to this. For example, the focus change unit 86 may include a plane mirror, an optical element that can change the focal point, and a scanning unit. The optical element referred to here is a known concave mirror or a variable focus lens, for example.

The focus change unit 86 in this case changes the projection direction of collimated light beam from the collimated light beam generator 84 by way of the plane mirror and the scanning unit, while the optical element changes the focal point so that images will be in focus on each screen.

Namely, the focus change unit 86 can be configured in any way as long as it is an optical mechanism configured such that the focal length can be changed and configured to direct the collimated light beam from the collimated light beam generator 84 toward the first screen 14 or the second screen 16.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An information display apparatus that reflects light representing information off a projection target to display the information as a virtual image, comprising:
   a projector that projects the light representing the information;
   at least two image forming devices, to which the light emitted from the projector is projected, that are disposed on an optical path from the projector to the projection target, and at least one of the at least two image forming devices is disposed at a distance from the projector different from a distance between the projector and remaining of the at least two image forming devices;
   a focus adjusting device that adjusts a focal length of one optical system disposed on an optical path from the projector to each of the at least two image forming devices such that the light emitted from the projector is in focus at each of the at least two image forming devices;
   control devices that control the projector such that projection of light to each of the at least two image forming devices is switched 60 times or more per second;
   wherein an image of information formed on each of the at least two image forming devices is reflected off the projection target,
   wherein the at least two image forming devices include:
      (i) a first image forming device that projects a first image to a lower region on a lower side of the projection target, and
      (ii) a second image forming device that projects a second image to an upper region on an upper side of the projection target,
   wherein a distance between the second image forming device and the projection target is longer than a distance between the first image forming device and the projection target,
   wherein the second image forming device is arranged below the first image forming device in a vertical direction of the projection target, and
   wherein the first image forming device is disposed such that an image forming plane of the first image forming device and a virtual image formed by being reflected off the projection target have a conjugate relationship.

2. The information display apparatus according to claim 1, further comprising:
   an optical unit that is disposed on an optical path from the each of the at least two image forming devices to the projection target and is configured to enlarge the image of information formed on each of the at least two image forming devices, wherein:
   the second image forming device is disposed such that an image forming plane of the second image forming device and a virtual image formed by being reflected off the projection target have a conjugate relationship.

3. The information display apparatus according to claim 1 mounted to an automobile, further comprising:
   an information acquisition device that acquires at least foreground information that is information on an object placed on a road on which the automobile is moving, and vehicle information that is information on a condition of the automobile; and
   a control device that controls the projector so as to emit light representing the foreground information acquired by the information acquisition device onto the second image forming device and to emit light representing the vehicle information onto the first image forming device.

4. The information display apparatus according to claim 1, wherein the focus adjusting device makes an adjustment so that an image is in focus in each of the at least two image forming devices every time the projector switches a destination of projected light.

5. The information display apparatus according to claim 1, wherein the projector is disposed such that an eye of a user of the information display apparatus and a pupil exit of the projector have a conjugate relationship.

6. The information display apparatus according to claim 1, wherein the at least two image forming devices are transmissive screens.

7. The information display apparatus according to claim 1, wherein at least one of the at least two image forming devices is a reflective screen.

* * * * *